(12) United States Patent
Guth et al.

(10) Patent No.: US 12,000,694 B2
(45) Date of Patent: Jun. 4, 2024

(54) COMPUTER-IMPLEMENTED METHOD FOR AUTOMATICALLY PRODUCING METROLOGY TEST PLAN

(71) Applicant: Carl Zeiss Industrielle Messtechnik GmbH, Oberkochen (DE)

(72) Inventors: Thomas Guth, Aalen (DE); Annett Froewis, Oberkochen (DE); Birgit Huber, Aalen (DE); Günter Haas, Aalen (DE); Ana Carolina Mayr Adam, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 239 days.

(21) Appl. No.: 17/201,912

(22) Filed: Mar. 15, 2021

(65) Prior Publication Data
US 2021/0285763 A1 Sep. 16, 2021

(30) Foreign Application Priority Data
Mar. 16, 2020 (EP) .................................... 20163348

(51) Int. Cl.
*G01B 21/20* (2006.01)

(52) U.S. Cl.
CPC .................... *G01B 21/20* (2013.01)

(58) Field of Classification Search
CPC ... G01B 21/20; G01B 21/047; G05B 19/4097
See application file for complete search history.

(56) References Cited

U.S. PATENT DOCUMENTS

| 5,542,188 A * | 8/1996 | Ertl ........................ G01B 21/12 |
| | | 33/549 |
| 2010/0268355 A1* | 10/2010 | Chang .................... G01B 21/04 |
| | | 700/66 |

(Continued)

FOREIGN PATENT DOCUMENTS

| DE | 102014214365 A1 | 7/2015 | |
| DE | 102014105456 | * 11/2015 | ............ B25J 19/022 |

(Continued)

OTHER PUBLICATIONS

David Flack, "Measurement Good Practice Guide No. 41", Engineering Measurement Division, National Physical Laboratory, Jul. 2001, 104 p.*

(Continued)

*Primary Examiner* — Alexander Satanovsky
(74) *Attorney, Agent, or Firm* — Miller Johnson

(57) ABSTRACT

A computer-implemented method automatically produces a test plan for measuring a measured object. The method includes obtaining a desired dataset of the measured object. The method includes providing a starting pattern. The providing comprises producing a division. The producing the division comprises applying at least one division function. The division has a plurality of division indices. The method includes producing a target pattern by generating a comparison between the desired dataset and the division. At least one division index is adapted in response to a deviation of the division from the desired dataset. The method includes creating at least one element with at least one piece of pattern information in the test plan in accordance with the target pattern.

20 Claims, 7 Drawing Sheets

(56) References Cited

U.S. PATENT DOCUMENTS

| | | | | |
|---|---|---|---|---|
| 2013/0030773 A1* | 1/2013 | O'Hare | ................ | G01B 21/04 |
| | | | | 703/1 |
| 2013/0167389 A1* | 7/2013 | Christoph | ............ | G01B 5/0014 |
| | | | | 33/503 |
| 2017/0241759 A1* | 8/2017 | Werner | ................ | B23Q 17/22 |
| 2018/0089360 A1* | 3/2018 | Madsen | ............... | G05B 19/401 |

FOREIGN PATENT DOCUMENTS

| | | |
|---|---|---|
| WO | 2016150517 A1 | 9/2016 |
| WO | 2019133234 A1 | 7/2019 |
| WO | 2019219202 A1 | 11/2019 |

OTHER PUBLICATIONS

Steven N. Spitz, "Dimensional Inspection Planning for Coordinate Measuring Machines", A Dissertation Presented to the Faculty of the Graduate School University of Southern California, Aug. 1999, 126 pages.*

\* cited by examiner

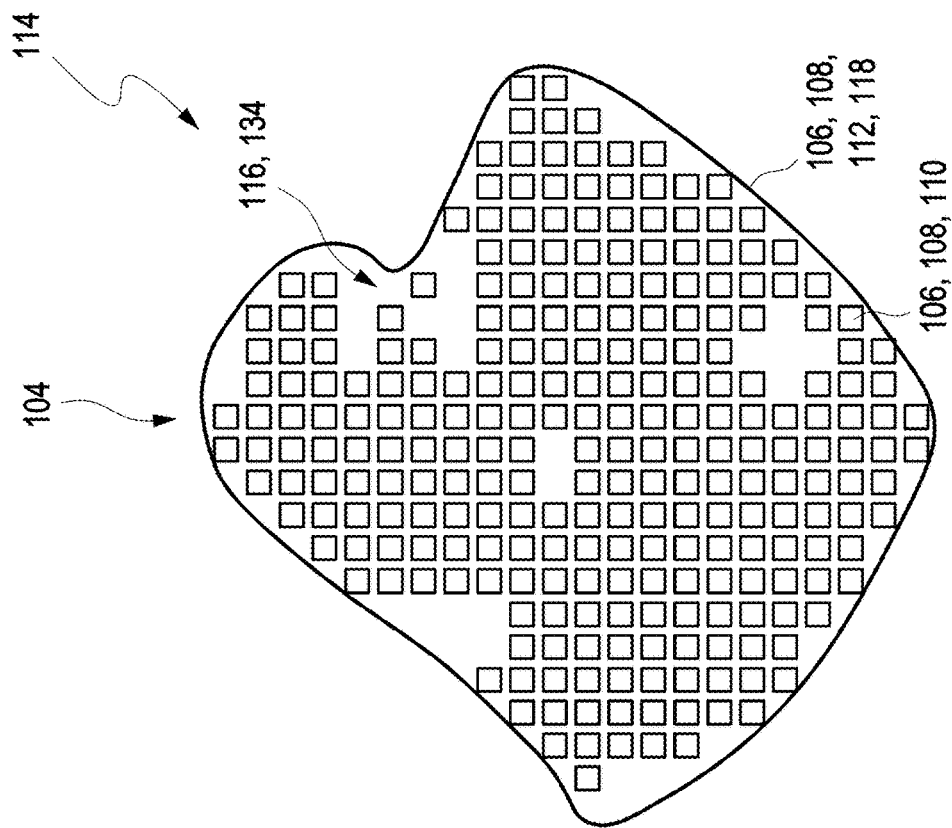
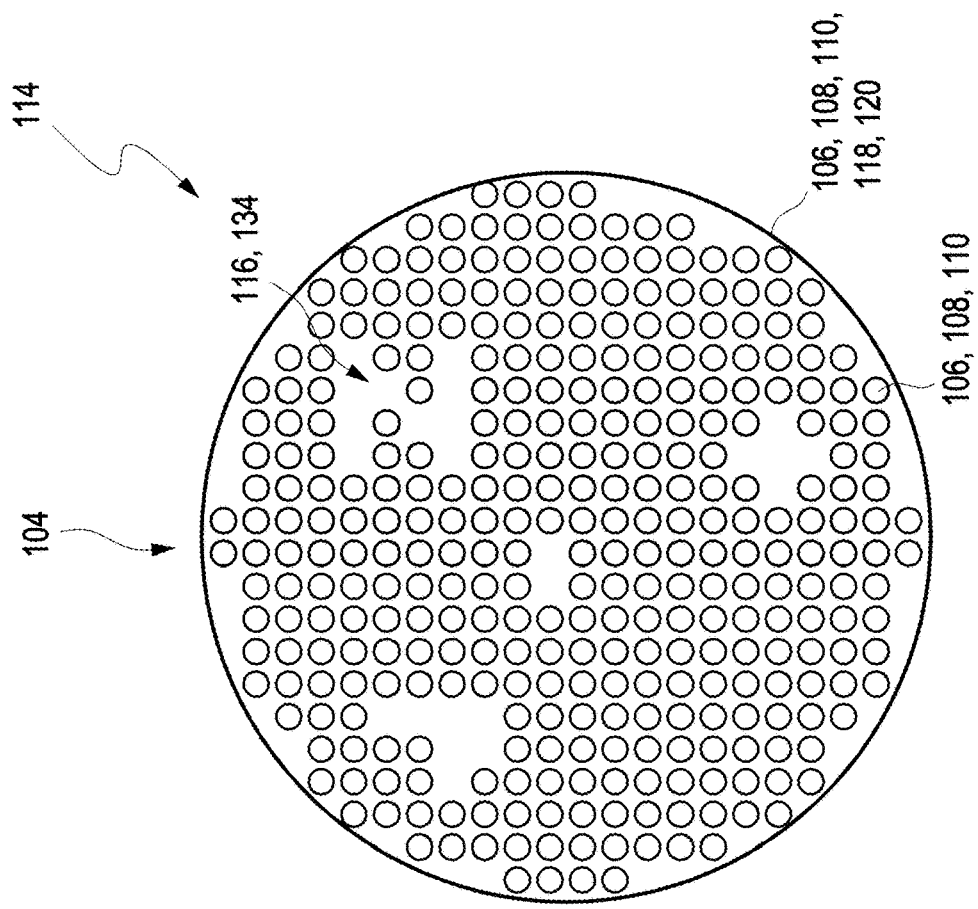

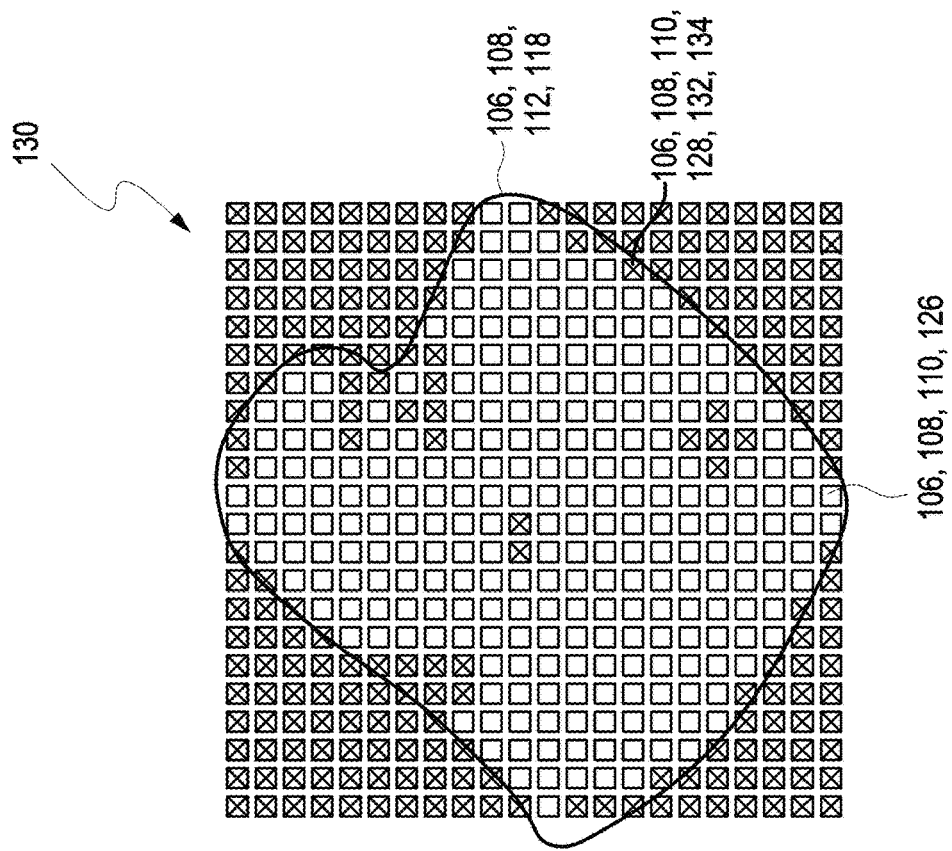
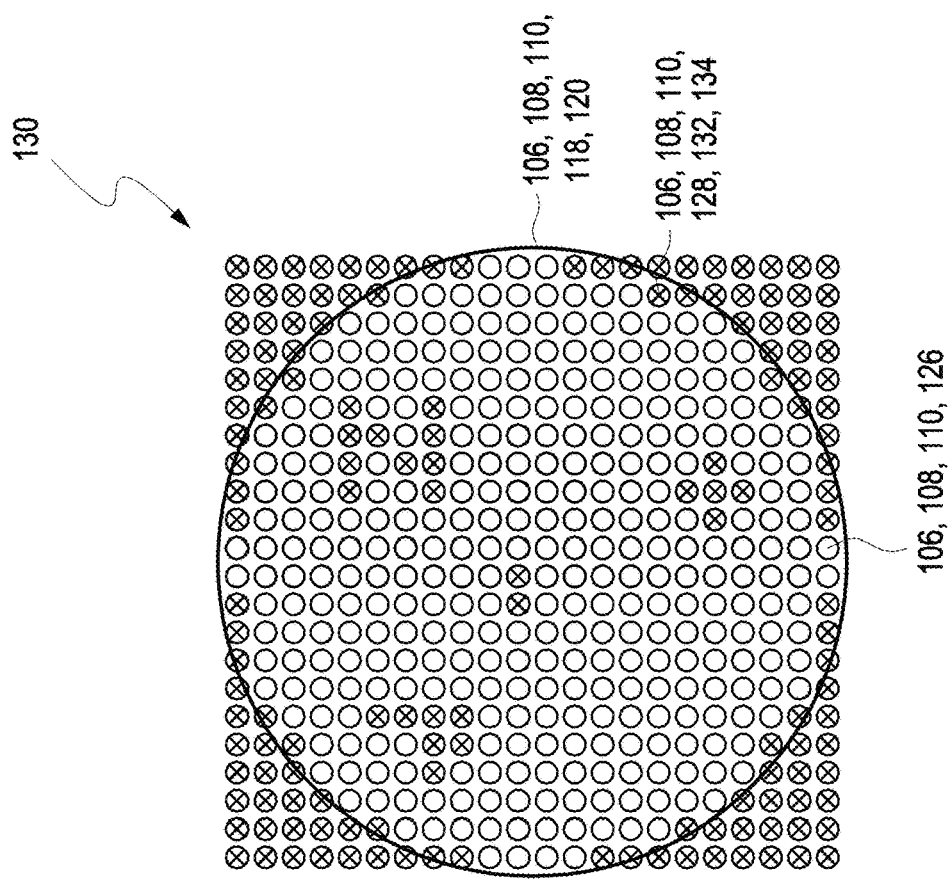

COMPUTER-IMPLEMENTED METHOD FOR AUTOMATICALLY PRODUCING METROLOGY TEST PLAN

CROSS-REFERENCE TO RELATED APPLICATIONS

This application claims priority to European Application No. 20 163 348.4 filed Mar. 16, 2020, the entire disclosure of which is incorporated by reference.

FIELD

The present disclosure relates to industrial metrology and more particularly to coordinate metrology using a coordinate measuring machine.

BACKGROUND

Various methods and devices for measuring measured objects, in particular measuring test features of geometric elements, are known from the prior art. These methods normally follow test plans, which need to be produced, or written, beforehand. The test plan deter-mines, among other things, what is intended to be measured and how it is intended to be measured. To produce test plans, a CAD model of the measured object is normally imported into a computer-based development environment provided for this purpose and said model is converted into a test plan. For example the measurement software CALYPSO® from ZEISS can automatically convert CAD datasets into test plans.

When there are a large number of geometric elements, one option is for the geometric elements each to be produced individually and each to be created as an individual element in the test plan. Measurement and evaluation strategies and test features must accordingly also be selected and assigned individually.

Alternatively, the geometric elements can be defined collectively using a pattern. Patterns can be advantageous, in particular, because only one of the geometries needs to be handled and all the other geometries are determined using the pattern position. Only one element is created using the pattern information in the test plan. Measurement and evaluation strategies can be selected and assigned per pattern. Such patterns are produced manually in known methods and devices. It is true that patterns can be produced by what is known as a division function.

However, the intention is not always to regard all the division positions, also referred to as indices, of the pattern in the measurement sequence, for example because the CAD model has no provision for a feature here. These unneeded division positions must therefore be masked, or deleted. This action has been able to be performed only manually to date. This can be complex and also susceptible to error. In particular given a very large number of geometric elements used, for example several thousand, and the associated test features, handling the patterns can become very unmanageable and time-consuming.

SUMMARY

It would therefore be desirable to provide a computer-implemented method for automatically producing a test plan, a computer program, a measurement method and a coordinate measuring machine that at least largely avoid the disadvantages of known methods and devices. In particular the aim is to reduce the amount of work and time involved in producing a test plan and to reduce susceptibility to error when producing the test plan.

This object is addressed by methods and devices having the features of the independent patent claims. Advantageous developments, which can be realized individually or in any combination, are presented in the dependent claims.

Hereinafter the terms "exhibit," "have," "comprise" or "include" or any grammatical deviations therefrom are used in a non-exclusive way. Accordingly these terms can refer either to situations in which, besides the features introduced by these terms, no further features are present, or to situations in which one or more further features are present. For example, the expression "A exhibits B," "A has B," "A comprises B" or "A includes B" can refer both to the situation in which no further element aside from B is provided in A (that is to say to a situation in which A consists exclusively of B) and to the situation in which, in addition to B, one or more further elements are provided in A, for example element C, elements C and D, or even further elements.

Furthermore, it is pointed out that the terms "at least one" and "one or more" and grammatical modifications of these terms, if they are used in association with one or more elements or features and are intended to express the fact that the element or feature can be provided singly or multiply, in general are used only once, for example when the feature or element is introduced for the first time. When the feature or element is subsequently mentioned again, the corresponding term "at least one" or "one or more" is generally no longer used, without restriction of the possibility that the feature or element can be provided singly or multiply.

Furthermore, hereinafter the terms "preferably," "in particular," "by way of example" or similar terms are used in conjunction with optional features, without alternative embodiments thereby being restricted. In this regard, features introduced by these terms are optional features, and there is no intention to restrict the scope of protection of the claims, and in particular of the independent claims, by these features. In this regard, the invention, as will be recognized by a person skilled in the art, can also be carried out using other configurations. Similarly, features introduced by "in one embodiment of the invention" or by "in one exemplary embodiment of the invention" are understood as optional features, without alternative configurations or the scope of protection of the independent claims thereby being intended to be restricted. Furthermore, all possibilities of combining the features introduced by these introductory expressions with other features, whether optional or non-optional features, are intended to remain unaffected by said introductory expressions.

In a first aspect of the present invention a computer-implemented method for automatically producing at least one test plan for measuring at least one measured object is proposed.

The term "computer-implemented" as used here is a broad term which is intended to be accorded its customary and familiar meaning as understood by a person skilled in the art. The term is not restricted to a specific or adapted meaning. The term can refer, without restriction, in particular to a method that involves at least one computer and/or at least one computer network. The computer and/or the computer network can comprise at least one processor, the processor being configured to perform at least one method step of the method of the invention. Each of the method steps is preferably performed by the computer and/or the computer network in each case.

The method can be performed fully automatically and specifically without user interaction. The term "automatic" as used here is a broad term which is intended to be accorded its customary and familiar meaning as understood by a person skilled in the art. The term is not restricted to a specific or adapted meaning. The term can refer, without restriction, in particular to a process that is performed completely by a computer and/or a computer network and/or a machine, in particular without user interaction and/or manual intervention. A user interaction can be required in order to initiate the process.

The term "test plan" as used here is a broad term which is intended to be accorded its customary and familiar meaning as understood by a person skilled in the art. The term is not restricted to a specific or adapted meaning. The term can refer, without restriction, in particular to a specification of at least one test, in particular to a result of a test planning. The test can be a quality test, for example. The test plan can have a plurality of elements, such as for example test specifications, test instructions and test sequence plans. The test specifications can establish test features. The test instructions can comprise instructions for performing the test. The test sequence plans can establish an order of the tests. Furthermore, the test plan can comprise information that determines a documentation of the test.

The term "test feature" as used here is a broad term which is intended to be accorded its customary and familiar meaning as understood by a person skilled in the art. The term is not restricted to a specific or adapted meaning. The term can refer, without restriction, in particular to a feature that is to be determined and/or to be inspected and/or to be tested of at least one measurement element. Determining and/or testing a test feature can comprise determining and/or testing dimensional deviations and/or shape deviations and/or positional deviations. The test feature can be a feature selected from the group consisting of: at least one length; at least one angular dimension, at least one surface parameter, a shape, an orientation.

The term "measurement element" as used here is a broad term which is intended to be accorded its customary and familiar meaning as understood by a person skilled in the art. The term is not restricted to a specific or adapted meaning. The term can refer, without restriction, in particular to a predetermined or predeterminable geometric element. The measurement element can be for example a geometric element selected from the group consisting of a circle, a cylinder, a rectangle, a straight line or another element with a regular geometry. The test feature can be determined and/or inspected for example by measuring points and/or lines and/or areas of the measured object.

The term "measured object" as used here is a broad term which is intended to be accorded its customary and familiar meaning as understood by a person skilled in the art. The term is not restricted to a specific or adapted meaning. The term can refer, without restriction, in particular to an arbitrarily shaped object to be measured. By way of example, the measured object can be selected from the group consisting of a test object, a workpiece, and a component to be measured. The term "measuring a measured object" as used here is a broad term which is intended to be accorded its customary and familiar meaning as understood by a person skilled in the art. The term is not restricted to a specific or adapted meaning. The term can refer, without restriction, in particular to capturing geometric dimensions of the object by means of position measurements and/or distance measurements and/or angle measurements.

The computer-implemented method for automatically producing at least one test plan comprises the following steps, which, as an example, can be performed in the following order. It is additionally possible to perform one or more of the method steps once or several times in repeating form. It is additionally possible to perform two or more of the method steps simultaneously or at least with an overlap in time. The method can also comprise further method steps, which are not listed.

The method comprises the following steps:
a) providing a desired dataset of the measured object;
b) providing a starting pattern, wherein the providing comprises producing a division, wherein the producing of the division comprises applying at least one division function to the starting pattern, wherein the division has a plurality of division indices;
c) producing a target pattern, wherein the producing of the target pattern comprises a comparison between desired dataset and the division, wherein at least one division index is adapted in the event of a deviation of the division from the desired dataset;
d) creating at least one element with at least one piece of pattern information in the test plan in accordance with the target pattern.

Steps a) to d) can each be performed fully automatically. The term "fully automatic" as used here is a broad term which is intended to be accorded its customary and familiar meaning as understood by a person skilled in the art. The term is not restricted to a specific or adapted meaning. The term can refer, without restriction, in particular to the fact that steps a) are d) are each performed completely by a computer and/or a computer network and/or a machine, in particular without user interaction and/or manual intervention. A user interaction can be required in order to initiate each of the individual steps. The user interaction can comprise the selecting of at least one dataset and/or the input of at least one command.

The term "desired dataset," also referred to as nominal dataset, as used here is a broad term which is intended to be accorded its customary and familiar meaning as understood by a person skilled in the art. The term is not restricted to a specific or adapted meaning. The term can refer, without restriction, in particular to a dataset that represents features of the real measured object as accurately as possible. The desired dataset can be produced from at least one model of the measured object and/or can comprise at least one model of the measured object. The model of the measured object can be and/or comprise a CAD model, for example. The CAD model can be three-dimensional or two-dimensional. The CAD model can comprise product and manufacturing information of the measured object. When generating the desired dataset it is possible, alternatively or additionally, to regard measurement data, for example from a test and/or a capture of at least one feature of the measured object using a coordinate measuring machine, and/or additional information pertaining to the configuration of the measured object.

The desired dataset can have a plurality of elements, in particular a plurality of geometric elements. The term "geometric element" as used here is a broad term which is intended to be accorded its customary and familiar meaning as understood by a person skilled in the art. The term is not restricted to a specific or adapted meaning. The term can refer, without restriction, in particular to an element of the desired dataset that is a feature to be inspected. The geometric elements can, by way of example, each be regular geometries, for example circles or rectangles. The desired dataset can alternatively or additionally have at least one special geometry, for example at least one curve, in particular a plurality of curves. The desired dataset can have special geometries, regular geometries or a combination of special geometries and regular geometries.

The desired dataset can have a pattern, for example. The elements of the desired dataset can form a pattern. By way of example, the pattern can be a pattern comprising multiple rectangles, triangles, hexagons or multiple circles. The term "pattern" as used here is a broad term which is intended to be accorded its customary and familiar meaning as understood by a person skilled in the art. The term is not restricted to a specific or adapted meaning. The term can refer, without restriction, in particular to a plurality of elements that are arranged substantially regularly and/or periodically and/or constantly in relation to one another. "Arranged substantially regularly and/or periodically and/or constantly in relation to one another" can be understood to mean that completely regular and/or periodic and/or constant arrangements and arrangements in which the pattern has regions that deviate from a regular and/or periodic and/or constant arrangement are conceivable. By way of example, the pattern can have absent positions.

The desired dataset can additionally comprise an outer contour, also referred to as edge boundary. By way of example, the outer contour can be defined by a capture of a geometry on the coordinate measuring machine. The outer contour can be a rotationally symmetrical edge boundary. The outer contour can be in particular a sphere or, in 2D, a circle. By way of example, the outer contour can be an outer circle. Other outer contours are also conceivable, in particular non-rotationally symmetrical or linear contours.

The term "providing the desired dataset" as used here is a broad term which is intended to be accorded its customary and familiar meaning as understood by a person skilled in the art. The term is not restricted to a specific or adapted meaning. The term can refer, without restriction, in particular to loading, in particular importing, and/or generating the desired dataset.

The term "starting pattern" as used here is a broad term which is intended to be accorded its customary and familiar meaning as understood by a person skilled in the art. The term is not restricted to a specific or adapted meaning. The term can refer, without restriction, in particular to a pattern, for example produced by a data processing unit which is to be adapted with regard to the desired dataset. The starting pattern can comprise a plurality of geometric elements. The geometric elements of the starting pattern can, by way of example, each be regular geometries, for example circles or rectangles. The providing of the starting pattern comprises producing at least one division, wherein the producing of the division comprises applying at least one division function. The division has a plurality of division indices. Methods for producing a division are known to a person skilled in the art. The division can be and/or comprise a loop via geometric elements. The division, or loop, in this instance can be a one-dimensional or multidimensional loop, for example. These can correspond to linear, rotationally symmetrical or further patterns. In the vernacular the division can be the same as a loop via a geometric element if it reproduces an original geometry according to a pattern.

The term "division" as used here is a broad term which is intended to be accorded its customary and familiar meaning as understood by a person skilled in the art. The term is not restricted to a specific or adapted meaning. The term can refer, without restriction, in particular to a plurality of geometric elements, for example produced by the data processing unit, for example a plurality of circular elements.

A position of each of the geometric elements in the division can be defined by the division function. The division can be a one-dimensional, two-dimensional or three-dimensional division. The division can be a linear division, a rotational division or an offset polar division. The producing of a linear division can comprise defining a first division index, wherein the defining comprises determining a position and a type of the division index, for example a circle. The producing of the linear division can comprise determining a total number of division indices in the x direction and/or in the y direction. The producing of the linear division can comprise determining an offset in at least one direction by a constant value. The division can be produced on the basis of the first division index by using the total number and the offset with the division function. The division function for a linear division can be a linear function.

The term "division index" as used here is a broad term which is intended to be accorded its customary and familiar meaning as understood by a person skilled in the art. The term is not restricted to a specific or adapted meaning. The term can refer, without restriction, in particular to individual elements of the division. The division indices can also be referred to as division elements. Elements can be created in accordance with the division indices in the test plan. By way of example, division indices can represent measured elements that are intended to be measured in a measurement method.

The method according to the invention proposes not deleting the elements that are missing in the real measured object manually but rather using a software algorithm to perform a matching between desired dataset and starting pattern, to delete the missing elements automatically from the starting pattern and thus to produce a target pattern on the basis of which the elements of the test plan are created. The matching of desired dataset and starting pattern in this instance is effected in particular not manually but rather fully automatically. The term "target pattern" as used here is a broad term which is intended to be accorded its customary and familiar meaning as understood by a person skilled in the art. The term is not restricted to a specific or adapted meaning. The term can refer, without restriction, in particular to a pattern adapted with regard to the desired dataset.

The adapting of the at least one division index can comprise masking the division index. The term "adapting" as used here is a broad term which is intended to be accorded its customary and familiar meaning as understood by a person skilled in the art. The term is not restricted to a specific or adapted meaning. The term can refer, without restriction, in particular to changing the division indices, in particular removing and/or deleting them, also referred to as masking. Masked division indices are disregarded when producing the test plan.

The desired dataset can have a pattern containing absent positions. The comparison can comprise removing and/or deleting all the division indices that correspond to the absent positions in the desired dataset.

The comparison between desired dataset and division can comprise regarding the outer contour of the desired dataset. The comparison can comprise removing and/or deleting all the division indices outside or inside the outer contour. By way of example, the outer contour can be an outer circle and all the division indices outside the outer circle can be deleted and/or removed. It is also conceivable to add division indices.

The comparison between desired dataset and division can comprise in particular a pattern comparison between desired dataset and division. The pattern comparison can comprise identifying and/or selecting a pattern position in the desired dataset. The pattern comparison can comprise identifying a pattern position in the division corresponding to the identified and/or selected pattern position in the desired dataset. The pattern comparison can comprise determining an existence or absence of an element of the desired dataset at the identified and/or selected pattern position in the desired dataset. The pattern matching can comprise determining an existence or absence of a division index at the pattern position corresponding to the identified and/or selected pattern position in the desired dataset. The pattern comparison can adapt the division, in particular by masking the division indices, in the event of a lack of concordance in the existence or absence at the pattern positions in the desired dataset and the corresponding pattern position in the division.

The term "pattern information" as used here is a broad term which is intended to be accorded its customary and familiar meaning as understood by a person skilled in the art. The term is not restricted to a specific or adapted meaning. The term can refer, without restriction, in particular to information that describes the pattern, in particular the target pattern. The pattern information can comprise information about a distribution of the elements of the pattern, position of the elements in the pattern, type of the elements or type of the pattern. The type of the pattern can be for example a division with polar offset, and/or a 1d linear division or a 2d linear division or rotational division or division with position list.

The term "creating" an element in the test plan as used here is a broad term which is intended to be accorded its customary and familiar meaning as understood by a person skilled in the art. The term is not restricted to a specific or adapted meaning. The term can refer, without restriction, in particular to adding and/or regarding an element in the test plan. Adapted division indices are not created in the test plan.

In a further aspect a measurement method for measuring the at least one measured object is proposed. The measurement method comprises producing a test plan using one of the described configurations of the method according to the invention for producing a test plan. With regard to definitions and configurations of the measurement method, reference is made to definitions and configurations with regard to the method for producing a test plan. The measurement method has at least one measurement step. The measurement step involves a measurement of the measured object being performed according to the test plan. In particular a coordinate measuring machine can be used in the measurement method. The coordinate measuring machine can be a coordinate measuring machine selected from the group consisting of: a tactile coordinate measuring machine, an optical coordinate measuring machine, a coordinate measuring machine based on a laser. Alternatively, the measurement method can be used on CT scanner systems.

Furthermore, within the context of the present invention, a computer program is proposed that, when executed on a computer or computer network, carries out one of the configurations of at least one of the methods according to the invention, in particular method steps a) to d).

Furthermore, within the context of the present invention, a computer program comprising program code means is proposed, in order to perform one of the configurations of the methods according to the invention when the program is executed on a computer or computer network. In particular, the program code means can be stored on a computer-readable data medium.

The terms "computer-readable data medium," "data store" and "computer-readable storage medium" as used here can refer in particular to non-transitory data stores, for example a hardware data storage medium on which computer-executable instructions are stored. The computer-readable data medium or the computer-readable storage medium can be or comprise in particular a storage medium such as a random access memory (RAM) and/or a read-only memory (ROM).

Moreover, within the context of the present invention, a data medium is proposed that stores a data structure that, after being loaded into a base and/or main memory of a computer or computer network, can carry out one of the configurations of the methods according to the invention.

A computer program product comprising program code means stored on a machine-readable medium is also proposed within the context of the present invention, in order to perform one of the configurations of the methods according to the invention when the program is executed on a computer or computer network.

In this case, a computer program product is understood to mean the product as a commercially available product. In principle, it can be available in any form, for example on paper or on a computer-readable data medium, and, in particular, it can be distributed via a data transmission network.

Finally, a modulated data signal is proposed within the context of the present invention, said modulated data signal containing instructions executable by a computer system or computer network for the purpose of carrying out a method according to one of the embodiments described.

With regard to the computer-implemented aspects of the invention, one or a plurality of or even all the method steps of the method in accordance with one or more of the configurations proposed here can be performed by means of a computer or computer network. Consequently, in general, any of the method steps, including the provision and/or manipulation of data, can be performed by means of a computer or computer network. In general, these steps can comprise any of the method steps, excluding the steps that require manual work, for example the selecting of datasets by the user.

In a further aspect, within the context of the present invention, a coordinate measuring machine for measuring at least one measured object with an arbitrary sensor or a CT scanner is proposed.

The term "coordinate measuring machine" as used here is a broad term which is intended to be accorded its customary and familiar meaning as understood by the person skilled in the art. The term is not restricted to a specific or adapted meaning. The term can refer, without restriction, in particular to a device for determining at least one coordinate of the measured object. The coordinate measuring machine can be a gantry-type measuring machine or a bridge-type measuring machine. The coordinate measuring machine can have a measuring table on which to place at least one workpiece to be measured. The coordinate measuring machine can comprise at least one gantry that comprises at least one first vertical column, at least one second vertical column and a crossbeam connecting the first vertical column and the second vertical column. At least one vertical column selected from the first and second vertical columns can be mounted so as to be movable on the measurement table. The horizontal direction can be a direction along a y-axis. The coordinate measuring machine can have a coordinate system, for example a Cartesian coordinate system or a spherical coordinate system. Other coordinate systems are also conceivable. An x-axis can run perpendicular to the y-axis in a plane of the bearing surface of the measuring table. A z-axis, also called longitudinal axis, can extend perpendicular to the plane of the bearing surface, in a vertical direction. The vertical columns can extend along the z-axis. The crossbeam can extend along the x-axis. By way of example, the coordinate measuring machine can be a tactile coordinate measuring machine. The term "tactile" as used here is a broad term which is intended to be accorded its customary and familiar meaning as understood by a person skilled in the art. The term is not restricted to a specific or adapted meaning. The term can refer, without restriction, in particular to a touch property. Tactile coordinate measuring machines can scan measured objects for measurement purposes. The tactile coordinate measuring machine can in particular ascertain whether the stipulated tolerances for a measured object are observed.

The coordinate measuring machine comprises at least one data processing unit. The term "data processing unit" as used here is a broad term which is intended to be accorded its customary and familiar meaning as understood by a person skilled in the art. The term is not restricted to a specific or adapted meaning. The term can refer, without restriction, in particular to an arbitrary logic circuit, for performing basic operations of a computer or system, and/or generally to a device configured to perform calculations or logic operations. The data processing unit can have a processor or a processor unit. The data processing unit can have for example an arithmetic and logic unit (ALU), a floating-point unit (FPU), such as a math coprocessor or numerical coprocessor, a plurality of registers and a main memory, for example a cache main memory. The data processing unit can have a multicore processor. The data processing unit can have a central processing unit (CPU). Alternatively or additionally, the data processing unit can have one or more application-specific integrated circuits and/or one or more field-programmable gate arrays (FPGAs) or the like.

The data processing unit is configured to produce at least one test plan for measuring the measured object.

The data processing unit comprises at least one interface configured to provide at least one desired dataset of the measured object and at least one starting pattern. The providing comprises producing a division. The producing of the division comprises applying at least one division function. The division has a plurality of division indices.

The term "interface" as used here is a broad term which is intended to be accorded its customary and familiar meaning as understood by a person skilled in the art. The term is not restricted to a specific or adapted meaning. The term can refer, without restriction, in particular to an element or part of the data processing unit that is configured to transmit information. The interface can be a communication interface, in particular a data interface, configured to receive data from another device and/or from a user and/or to transmit data from the interface to further components of the data processing unit and/or to external devices. The interface can comprise at least one electronic interface and/or a human-machine interface such as for example an input/output device such as a display and/or a keyboard. The interface can have at least one data connection, for example a Bluetooth connection, an NFC connection or another connection. The interface can have at least one network or be part of a network. The interface can have at least one Internet port, at least one USB port, at least one drive or a web interface.

The data processing unit is configured to produce a target pattern. The data processing unit is configured to compare the desired dataset and the division. The data processing unit is configured to adapt at least one division index in the event of a deviation of the division from the desired dataset. The data processing unit is configured to create at least one element with at least one piece of pattern information in the test plan in accordance with the target pattern.

The coordinate measuring machine can have at least one controller configured to control at least one component of the coordinate measuring machine to measure the measured object in accordance with the test plan.

The coordinate measuring machine can be configured to carry out one of the configurations of a method according to the invention for producing a test plan and/or one of the configurations of a measurement method according to the invention. With regard to definitions and configurations of the measurement method, reference is made to definitions and configurations with regard to the method for producing a test plan.

The proposed devices and methods have numerous advantages over known devices and methods. As such, improved automation for the production of test plans allows time involvement and labor to be reduced. Furthermore, it is likewise possible to reduce susceptibility to error as compared with manual handling.

In summary, without restriction of further possible configurations, the following embodiments are proposed:

Embodiment 1: Computer-implemented method for automatically producing at least one test plan for measuring at least one measured object, wherein the method comprises the following steps:

providing a desired dataset of the measured object;

providing a starting pattern, wherein the providing comprises producing a division, wherein the producing of the division comprises applying at least one division function, wherein the division has a plurality of division indices;

producing a target pattern, wherein the producing of the target pattern comprises a comparison between desired dataset and the division, wherein at least one division index is adapted in the event of a deviation of the division from the desired dataset;

creating at least one element with at least one piece of pattern information in the test plan in accordance with the target pattern.

Embodiment 2: Method according to the preceding embodiment, wherein the desired dataset is produced from at least one model of the measured object and/or comprises at least one model of the measured object, wherein the model of the measured object is and/or comprises a CAD model.

Embodiment 3: Method according to either of the preceding embodiments, wherein the desired dataset has a plurality of elements, wherein the desired dataset has special geometries, regular geometries or a combination of special geometries and regular geometries.

Embodiment 4: Method according to one of the preceding embodiments, wherein the adapting of the at least one division index comprises masking the division index.

Embodiment 5: Method according to one of the preceding embodiments, wherein the desired dataset has a pattern containing absent positions, wherein the comparison comprises removing and/or deleting all the division indices that correspond to the absent positions in the desired dataset.

Embodiment 6: Method according to one of the preceding embodiments, wherein the desired dataset comprises an outer contour.

Embodiment 7: Method according to the preceding embodiment, wherein the comparison between desired dataset and division comprises regarding the outer contour, wherein the comparison comprises removing and/or deleting all the division indices outside or inside the outer contour.

Embodiment 8: Method according to one of the preceding embodiments, wherein the comparison comprises a pattern comparison between desired dataset and division.

Embodiment 9: Method according to the preceding embodiment, wherein adapted division indices are not created in the test plan.

Embodiment 10: Measurement method for measuring at least one measured object, wherein the measurement method comprises producing a test plan according to one of the preceding embodiments that relate to a method for producing a test plan, wherein the measurement method has at least one measurement step, wherein the measurement step involves a measurement of the measured object being performed in accordance with the test plan.

Embodiment 11: Computer program that, when executed on a computer or computer network, carries out one of the configurations of a method for producing a test plan according to one of the preceding embodiments that relate to a method for producing a test plan, in particular method steps a) to d), and/or of a measurement method according to the preceding embodiment.

Embodiment 12: Computer program product comprising program code means stored on a machine-readable medium, in order to perform a method for producing a test plan according to one of the preceding embodiments that relate to a method for producing a test plan and/or a measurement method according to the preceding embodiment but one when the program is executed on a computer or computer network.

Embodiment 13: Coordinate measuring machine for measuring at least one measured object, wherein the coordinate measuring machine comprises at least one data processing unit, wherein the data processing unit is configured to produce at least one test plan for measuring the measured object, wherein the data processing unit comprises at least one interface configured to provide at least one desired dataset of the measured object and at least one starting pattern, wherein the providing comprises producing a division, wherein the producing of the division comprises applying at least one division function, wherein the division has a plurality of division indices, wherein the data processing unit is configured to produce a target pattern, wherein the data processing unit is configured to compare the desired dataset and the division, wherein the data processing unit is configured to adapt at least one division index in the event of a deviation of the division from the desired dataset, wherein the data processing unit is configured to create at least one element with at least one piece of pattern information in the test plan in accordance with the target pattern.

Embodiment 14: Coordinate measuring machine according to the preceding embodiment, wherein the coordinate measuring machine has at least one controller configured to control at least one component of the coordinate measuring machine to measure the measured object in accordance with the test plan.

Embodiment 15: Coordinate measuring machine according to one of the preceding embodiments that relate to a coordinate measuring machine, wherein the coordinate measuring machine is configured to carry out a method for producing a test plan according to one of the preceding embodiments that relate to a method for producing a test plan and/or a measurement method according to embodiment 10.

BRIEF DESCRIPTION OF THE DRAWINGS

Further details and features of the invention will become apparent from the following description of exemplary embodiments, in particular in conjunction with the dependent claims. In this case, the respective features can be realized by themselves or as a plurality in combination with one another. The invention is not restricted to the exemplary embodiments. The exemplary embodiments are illustrated schematically in the figures. In this case, identical reference numerals in the individual figures designate identical or functionally identical elements or elements corresponding to one another with regard to their functions.

FIGS. 2A and 2B are two example embodiments of desired datasets;

FIGS. 4A and 4B are two example embodiments for adaptations of a starting pattern;

DETAILED DESCRIPTION

Figure 1:
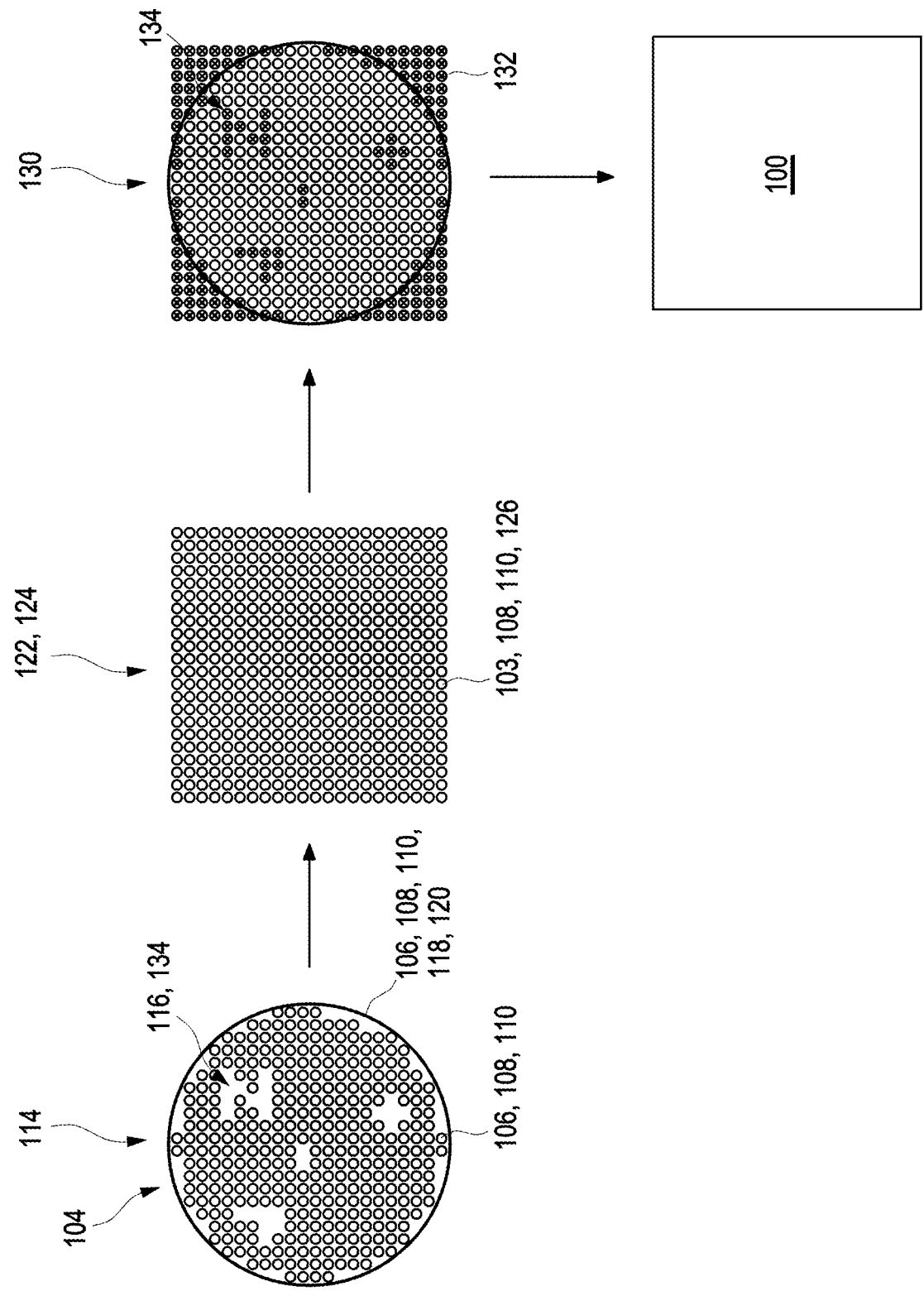
FIG. 1 is an example embodiment of the method according to the principles of the present disclosure.

FIG. 1 shows a flowchart for an exemplary embodiment of a computer-implemented method according to the invention for automatically producing at least one test plan 100 for measuring at least one measured object 102, which is not depicted in the figures. The method can involve at least one computer and/or at least one computer network. The computer and/or the computer network can comprise at least one processor, the processor being configured to perform at least one method step of the method of the invention. Each of the method steps is preferably performed by the computer and/or the computer network in each case. The method can be performed fully automatically and specifically without user interaction.

The test plan 100 can be a specification of at least one test, in particular a result of a test planning. The test can be a quality test, for example. The test plan 100 can have a plurality of elements, such as for example test specifications, test instructions and test sequence plans. The test specifications can establish test features. The test feature can be a feature that is to be determined and/or to be inspected and/or to be tested of at least one measurement element 103. Determining and/or testing a test feature can comprise determining and/or testing dimensional deviations and/or shape deviations and/or positional deviations. The test feature can be a feature selected from the group consisting of: at least one length; at least one angular dimension, at least one surface parameter, a shape, an orientation. The measurement element 103 can be a predetermined or predeterminable geometric element. The measurement element 103 can be for example a geometric element selected from the group consisting of a circle, a cylinder, a rectangle, a straight line or another element with a regular geometry. The test feature can be determined and/or inspected for example by measuring points and/or lines and/or areas of the measured object 102. The test instructions of the test plan can comprise instructions for performing the test. The test sequence plans can establish an order of the tests. Furthermore, the test plan 100 can comprise information that determines a documentation of the test.

The measured object 102 can be an arbitrarily shaped object to be measured. By way of example, the measured object 102 can be selected from the group consisting of a test object, a workpiece, and a component to be measured. The measurement of a measured object 102 can comprise capturing geometric dimensions of the measured object 102 by means of position measurements and/or distance measurements and/or angle measurements.

The method comprises providing a desired dataset 104 of the measured object 102. The providing of the desired dataset 104 can comprise loading, in particular importing, and/or generating the desired dataset 104. The desired dataset 104 can be and/or comprise a dataset that represents features of the real measured object 102 as accurately as possible. The desired dataset 104 can be produced from at least one model of the measured object 102 and/or can comprise at least one model of the measured object 102. The model of the measured object 102 can be and/or comprise a CAD model, for example. The CAD model can be three-dimensional or two-dimensional. The CAD model can comprise product and manufacturing information of the measured object 102. When generating the desired dataset 104 it is possible, alternatively or additionally, to regard measurement data, for example from a test and/or a capture of at least one feature of the measured object 102 using a coordinate measuring machine 136, and/or additional information pertaining to the configuration of the measured object 102.

The desired dataset 104 can have a plurality of elements 106, in particular a plurality of geometric elements 108. Geometric elements 108 can comprise features to be inspected. The geometric elements 108 can, by way of example, each be regular geometries 110, for example circles or rectangles. The desired dataset 104 can alternatively or additionally have at least one special geometry 112, for example at least one curve, in particular a plurality of curves. The desired dataset 104 can have special geometries 112, regular geometries 110 or a combination of special geometries 112 and regular geometries 110.

The desired dataset 104 can have a pattern 114, for example. The elements 106 of the desired dataset 104 can form a pattern 114. By way of example, the pattern 114 can be a pattern 114 comprising multiple rectangles, triangles, hexagons or multiple circles. The pattern 114 can have a plurality of elements 106 that are arranged substantially regularly and/or periodically and/or constantly in relation to one another. Completely regular and/or periodic and/or constant arrangements and arrangements in which the pattern 114 has regions that deviate from a regular and/or periodic and/or constant arrangement are conceivable. By way of example, the pattern 114 can have absent positions 116.

The desired dataset 104 can additionally comprise an outer contour 118, also referred to as edge boundary. By way of example, the outer contour 118 can be defined by a capture of a geometry on the coordinate measuring machine 136. The outer contour 118 can be a rotationally symmetrical edge boundary. The outer contour 118 can be in particular a sphere or, in 2D, a circle. By way of example, the outer contour 118 can be an outer circle 120. Other outer contours 118 are also conceivable, in particular non-rotationally symmetrical or linear contours.

The method comprises providing a starting pattern 122. The providing comprises producing a division 124. The producing of the division 124 comprises applying at least one division function. The division 124 has a plurality of division indices 126. The starting pattern 122 can be a pattern 114, for example produced by a data processing unit 150, which is to be adapted with regard to the desired dataset 104. The starting pattern 122 can comprise a plurality of geometric elements 108. The geometric elements 108 of the starting pattern 122 can, by way of example, each be regular geometries, for example circles or rectangles. The providing of the starting pattern 122 comprises producing the at least one division 124. The division 124 has a plurality of division indices 126. Methods for producing a division 124 are known to a person skilled in the art, for example from the instruction manual of a piece of software, for example CALYPSO® from ZEISS, or from applicable training documents. The division 124 can have a plurality of geometric elements 108, for example produced by the data processing unit 150, for example a plurality of circular elements. A position of each of the geometric elements 108 in the division 124 can be defined by the division function. The division indices 124 can be elements 106 of the division 124. Elements 106 can be created in accordance with the division indices 126 in the test plan 100. By way of example, division indices 126 can represent measured elements 103 that are intended to be measured in a measurement method.

The method comprises producing a target pattern 130. The producing of the target pattern 130 comprises a comparison between desired dataset 104 and the division 124. At least one division index 126 is adapted in the event of a deviation of the division 124 from the desired dataset 104. The method according to the invention proposes not deleting the elements 106 that are missing in the real measured object 102 manually but rather using a software algorithm to perform a matching between desired dataset 104 and starting pattern 122, to delete the missing elements 106 automatically from the starting pattern 122 and thus to produce a target pattern 130 on the basis of which the elements 106 of the test plan 100 are created. The matching of desired dataset 104 and starting pattern 122 in this instance is effected in particular not manually but rather fully automatically. The target pattern 130 can be a pattern 114 adapted with regard to the desired dataset 104.

The adapting can comprise changing the division indices 126. In particular, the adapting can comprise removing and/or deleting them, also referred to as masking. Masked division indices 132 are disregarded when producing the test plan 100.

The desired dataset 104 can have a pattern 114 containing absent positions 116. The comparison can comprise removing and/or deleting all the division indices 126 that correspond to the absent positions 116 in the desired dataset 104.

The comparison between desired dataset 104 and division 124 can comprise regarding the outer contour 118 of the desired dataset 104. The comparison can comprise removing and/or deleting all the division indices 126 outside or inside the outer contour 118. By way of example, the outer contour 118 can be an outer circle 120 and all the division indices 126 outside the outer circle 120 can be deleted and/or removed. It is also conceivable to add division indices 126.

The comparison between desired dataset 104 and division 124 can comprise in particular a pattern comparison between desired dataset 104 and division 124. The pattern comparison can comprise identifying and/or selecting a pattern position in the desired dataset 104, for example by using an image processing algorithm. The pattern comparison can comprise identifying a pattern position in the division 124 corresponding to the identified and/or selected pattern position in the desired dataset. The pattern comparison can comprise determining an existence or absence of an element 106 of the desired dataset 104 at the identified and/or selected pattern position 134 in the desired dataset 104.

The pattern matching can comprise determining an existence or absence of a division index 126 at the pattern position 134 corresponding to the identified and/or selected pattern position 134 in the desired dataset 104. The pattern comparison can adapt the division 124, in particular by masking the division indices 126, in the event of a lack of concordance in the existence or absence at the pattern positions 134 in the desired dataset 104 and the corresponding pattern position 134 in the division 124.

The method also comprises creating at least one element with at least one piece of pattern information in the test plan 100 in accordance with the target pattern 130. The pattern information can have information describing the target pattern 130. The pattern information can comprise information about a distribution of the elements 106 of the target pattern 130, position of the elements 106 in the target pattern 130, type of the elements 106 of the target pattern 130 or type of the pattern. The type of the pattern can be for example a division with polar offset, or a 1d linear division or a 2d linear division or rotational division or division with position list. The creating of an element in the test plan can comprise adding and/or regarding an element in the test plan 100. Adapted division indices 126 are not created in the test plan 100.

FIGS. 2A and 2B show two exemplary embodiments of desired datasets 104. In the exemplary embodiment in FIG. 2A the desired dataset 104 comprises a pattern 114 comprising multiple circles. The desired dataset 104 in FIG. 2A has an outer contour 118 in the form of a rotationally symmetrical edge boundary, in particular an outer circle 120. In the exemplary embodiment in FIG. 2B the desired dataset 104 comprises a pattern 114 comprising multiple rectangles. The desired dataset 104 in FIG. 2B has an outer contour 118 in the form of a non-rotationally symmetrical or nonlinear curve.

Figure 3:
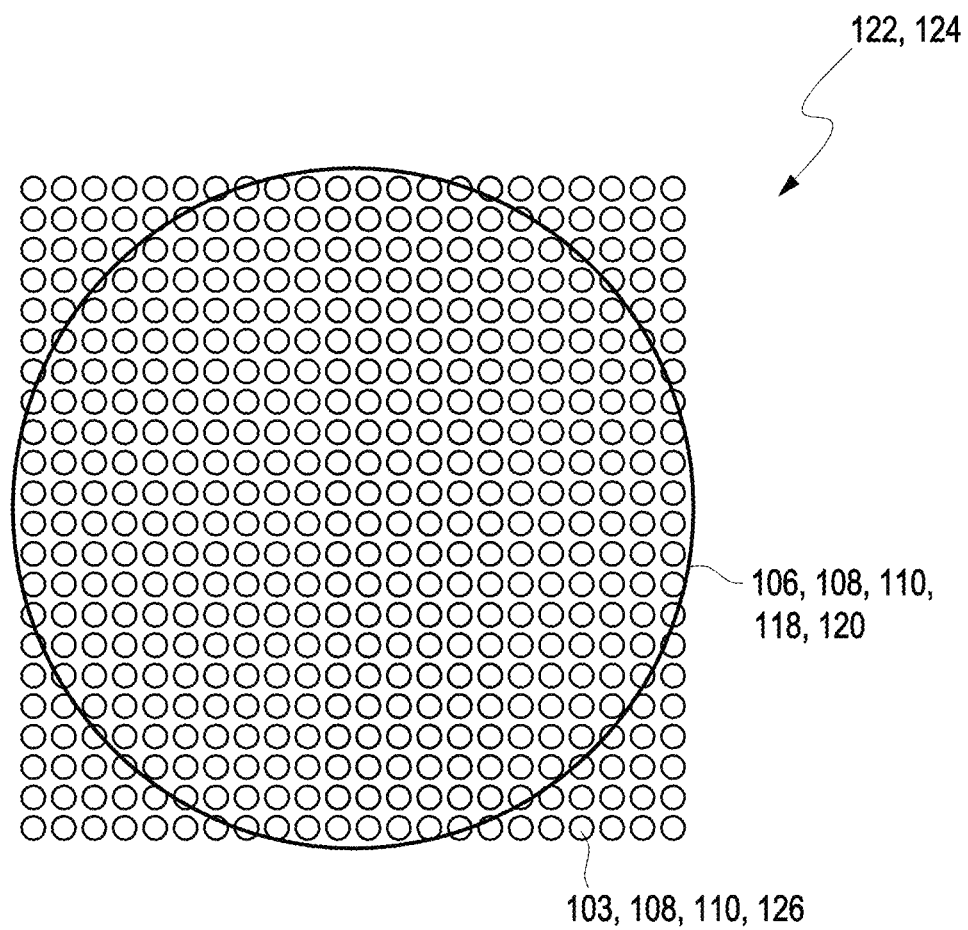
FIG. 3 is an example embodiment of a division.

FIG. 3 shows an exemplary embodiment of a division 124. The division 124 comprises a plurality of circular division indices 126. Furthermore, an outer contour 118 in the form of an outer circle 120 is shown.

FIGS. 4A and 4B show exemplary embodiments for an adaptation of a starting pattern 122. FIG. 4A shows an adaptation of the starting pattern 122 for the desired dataset 104 from FIG. 2A. FIG. 4B shows an adaptation of the starting pattern 122 for the desired dataset 104 from FIG. 2B. The existence or absence of elements 106 at the respective pattern positions in starting pattern 122 and desired dataset 104 is compared. Absent positions 116 at pattern positions 134 in this instance are masked, this being depicted in FIGS. 4A and 4B in the form of "X".

Figure 5:
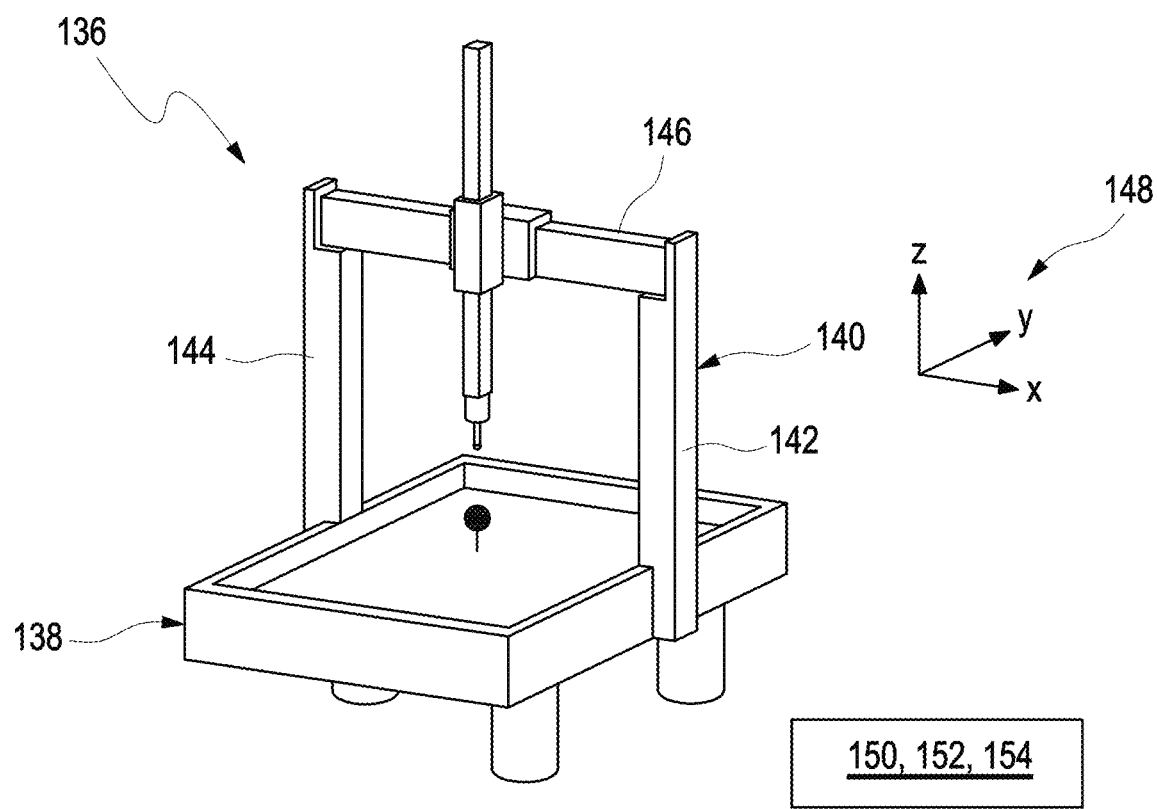
FIG. 5 is a schematic illustration of an example embodiment of a coordinate measuring machine according to the invention.

FIG. 5 shows a schematic illustration of an exemplary embodiment of a coordinate measuring machine 136 according to the invention for measuring at least one measured object 102. The coordinate measuring machine 136 can be a device for determining at least one coordinate of the measured object 102. The coordinate measuring machine can be a gantry-type measuring machine or a bridge-type measuring machine. The coordinate measuring machine 136 can have a measuring table 138 on which to place at least one workpiece to be measured.

The coordinate measuring machine can have at least one gantry 140 that comprises at least one first vertical column 142, at least one second vertical column 144 and a crossbeam 146 connecting the first vertical column 142 and the second vertical column 144. At least one vertical column selected from the first and second vertical columns 142 and 144 can be mounted so as to be movable on the measurement table 138. The horizontal direction can be a direction along a y-axis. The coordinate measuring machine 136 can have a coordinate system 148, for example a Cartesian coordinate system or a spherical coordinate system. Other coordinate systems are also conceivable. An x-axis can run perpendicular to the y-axis in a plane of the bearing surface of the measuring table 138. A z-axis, also called longitudinal axis, can extend perpendicular to the plane of the bearing surface, in a vertical direction. The vertical columns 142 and 144 can extend along the z-axis. The crossbeam 146 can extend along the x-axis.

The coordinate measuring machine 136 can be a tactile coordinate measuring machine, as shown in FIG. 5. Tactile coordinate measuring machines can scan measured objects 102 for measurement purposes. The tactile coordinate measuring machine can in particular ascertain whether the stipulated tolerances for a measured object are observed. Coordinate measuring machines 136 with other sensors and based on other sensor principles or CT scanners are also conceivable, however.

The coordinate measuring machine comprises at least one data processing unit 150. The data processing unit 150 can have an arbitrary logic circuit, for performing basic operations of a computer or system, and/or generally a device configured to perform calculations or logic operations. The data processing unit can have a processor or a processor unit. The data processing unit can have for example an arithmetic and logic unit (ALU), a floating-point unit (FPU), such as a math coprocessor or numerical coprocessor, a plurality of registers and a main memory, for example a cache main memory. The data processing unit 150 can have a multicore processor. The data processing unit 150 can have a central processing unit (CPU). Alternatively or additionally, the data processing unit 150 can have one or more application-specific integrated circuits and/or one or more field-programmable gate arrays (FPGAs) or the like. The data processing unit 150 is configured to produce at least one test plan 100 for measuring the measured object 102.

The data processing unit 150 comprises at least one interface 152 configured to provide at least one desired dataset 104 of the measured object 102 and at least one starting pattern 122. The providing comprises producing a division 124. The producing of the division 124 comprises applying at least one division function. The division 124 has a plurality of division indices 126.

The interface 152 can be a communication interface, in particular a data interface, configured to receive data from another device and/or from a user and/or to transmit data from the interface 152 to further components of the data processing unit and/or to external devices. The interface 152 can comprise at least one electronic interface and/or a human-machine interface such as for example an input/output device such as a display and/or a keyboard. The interface 152 can have at least one data connection, for example a Bluetooth connection, an NFC connection or another connection. The interface 152 can have at least one network or be part of a network. The interface 152 can have at least one Internet port, at least one USB port, at least one drive or a web interface.

The data processing unit 150 is configured to produce a target pattern 130. The data processing unit 150 is configured to compare the desired dataset 104 and the division 124. The data processing unit 150 is configured to adapt at least one division index 126 in the event of a deviation of the division 124 from the desired dataset. The data processing unit 150 is configured to create at least one element 106 with at least one piece of pattern information in the test plan 100 in accordance with the target pattern 130.

The coordinate measuring machine 136 can have at least one controller 154 configured to control at least one component of the coordinate measuring machine 136 to measure the measured object 102 in accordance with the test plan 100.

FIGS. 6A to 6E show further exemplary embodiments of adapted divisions 124. The division 124 can be a one-dimensional, two-dimensional or three-dimensional division 124. The division 124 can be a linear division, a rotational division or an offset polar division. The producing of a linear division 124 can comprise defining a first division index 126, wherein the defining comprises determining a position and a type of the division index, for example a circle. The producing of the linear division 124 can comprise determining a total number of division indices 126 in the x direction and/or in the y direction. The producing of the linear division 124 can comprise determining an offset in at least one direction by a constant value. The division 124 can be produced on the basis of the first division index 126 by using the total number and the offset with the division function. The division function for a linear division can be a linear function.

Figure 6:
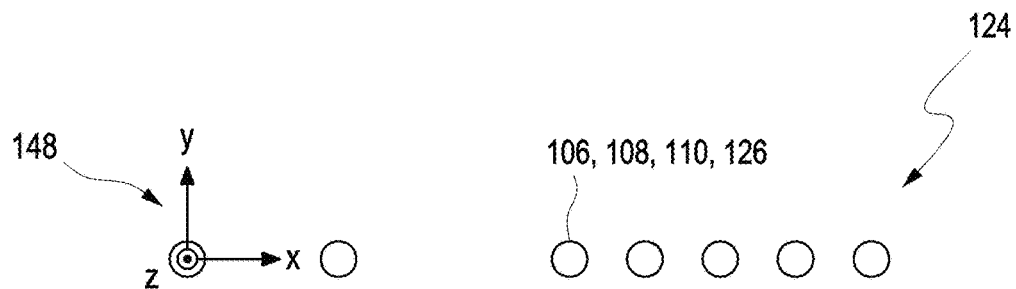
FIGS. 6A-6E are further example embodiments of divisions.
Figure 6:
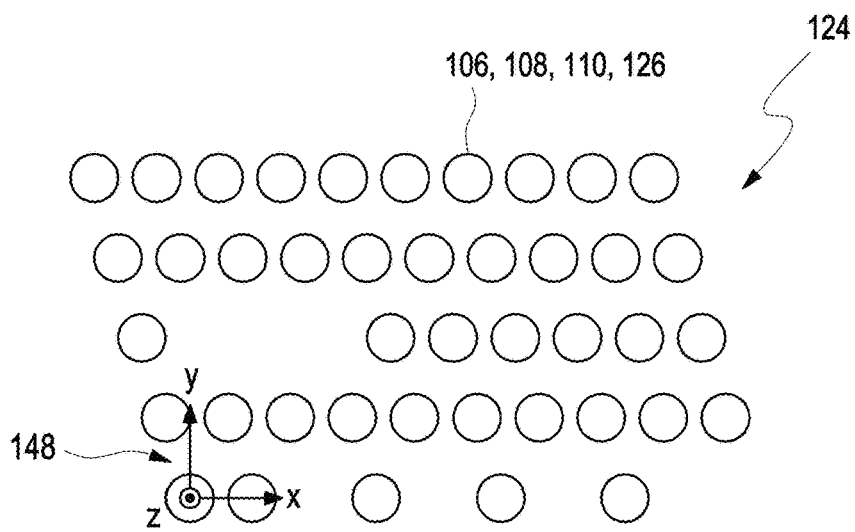
Figure 6:
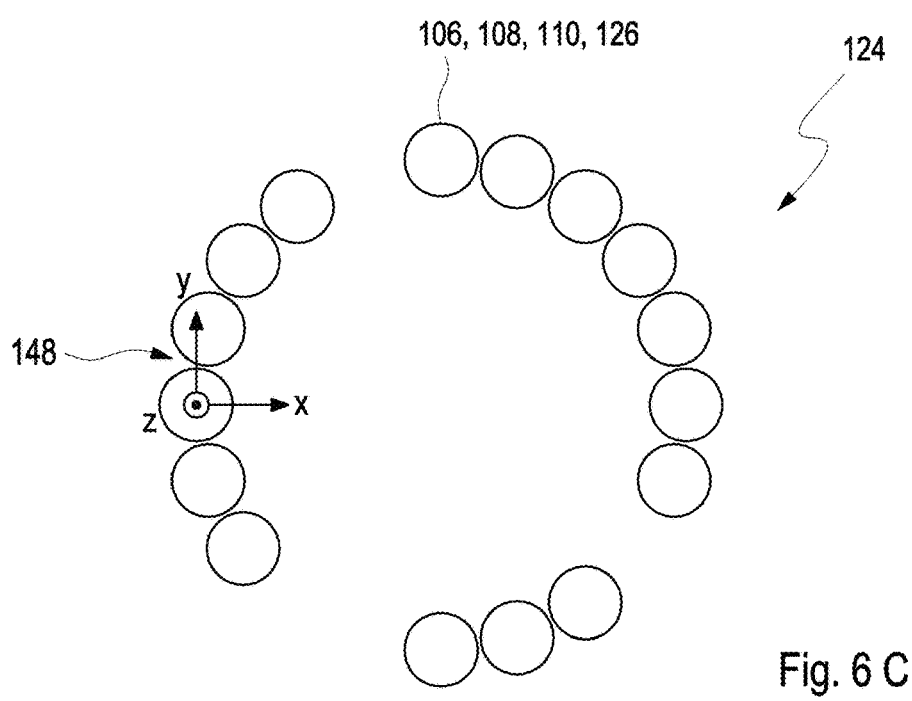
Figure 6:
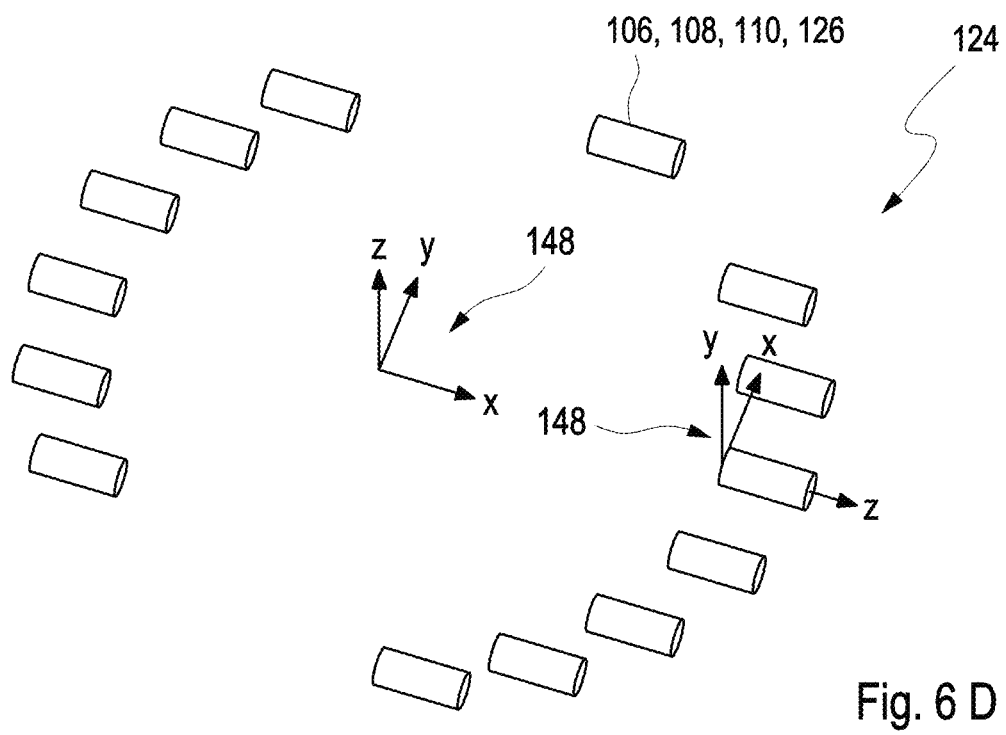
Figure 6:
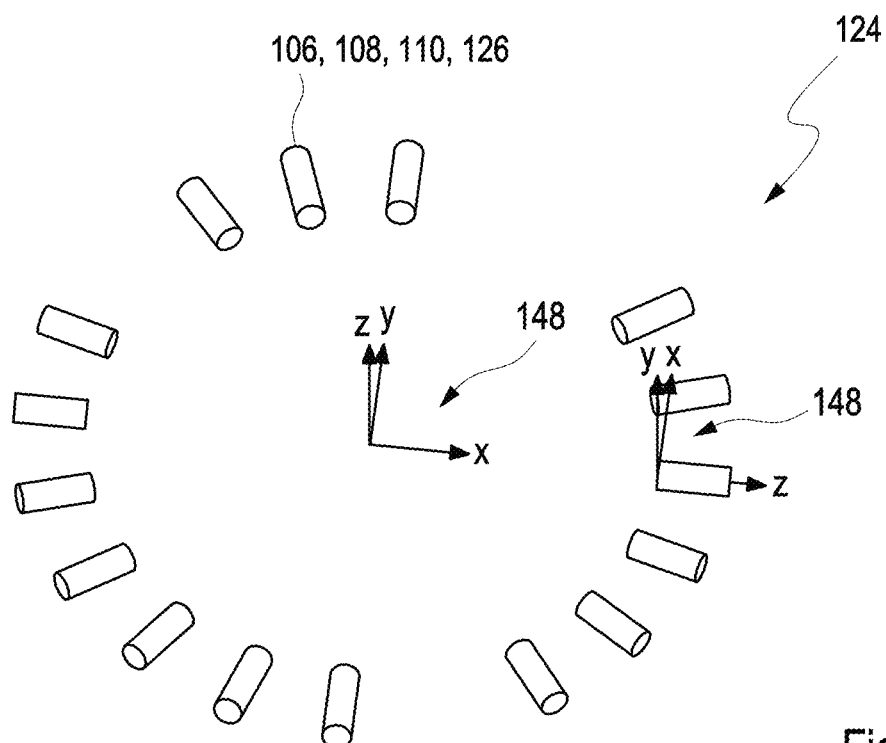

FIG. 6A shows an example of a linear division 124 in 1D in an x direction, with division indices 126 absent at some positions, said division indices having been removed during the adaptation of the division. FIG. 6B shows an example of a 2D linear division 124 in x and y directions, with division indices 126 absent at some positions, said division indices having been removed during the adaptation of the division. FIG. 6C shows an example of a rotational division, with division indices 126 absent at some positions. FIG. 6D shows an example of an offset polar division, with division indices 126 absent at some positions, said division indices having been removed during the adaptation of the division. FIG. 6E shows an example of a rotational division with an offset in the z direction, with division indices 126 absent at some positions, said division indices having been removed during the adaptation of the division.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The phrase at least one of A, B, and C should be construed to mean a logical (A OR B OR C), using a non-exclusive logical OR, and should not be construed to mean "at least one of A, at least one of B, and at least one of C.

In the drawings, reference numbers may be reused to identify similar and/or identical elements.

100 Test plan
102 Measured object
103 Measurement element
104 Desired dataset
106 Element
108 Geometric element
110 Regular geometry
112 Special geometry
114 Pattern
116 Absent position
118 Edge boundary or outer contour
120 Outer circle
122 Starting pattern
124 Division
126 Division index
128 Adapted element
130 Target pattern
132 Masked division index
134 Pattern position
136 Coordinate measuring machine
138 Measuring table
140 Gantry
142 First vertical column
144 Second vertical column
146 Crossbeam
148 Coordinate system
150 Data processing unit
152 Interface
154 Controller

What is claimed is:

1. A computer-implemented method for automatically producing a test plan for measuring a measured object, the method comprising:
    obtaining a desired dataset of the measured object;
    providing a starting pattern that is independent of measurement data of the measured object, wherein:
        the providing comprises producing a division,
        the producing the division comprises applying at least one division function, and
        the division has a plurality of division indices;
    producing a target pattern by generating a comparison between the desired dataset and the division, wherein at least one division index is adapted in response to a deviation of the division from the desired dataset;
    creating at least one element with at least one piece of pattern information in the test plan in accordance with the target pattern; and
    according to the test plan, controlling operation of a coordinate measuring machine to measure the measured object.

2. The method of claim 1 wherein:
    the desired dataset comprises a model of the measured object; and
    the model of the measured object includes a CAD model.

3. The method of claim 1 wherein:
    the desired dataset is produced based on a model of the measured object; and
    the model of the measured object includes a CAD model.

4. The method of claim 1 wherein:
    the desired dataset has a plurality of elements; and
    the desired dataset has at least one of special geometries and regular geometries.

5. The method of claim 1 wherein the adapting of the at least one division index comprises masking the division index.

6. The method of claim 1 wherein:
    the desired dataset has a pattern containing absent positions; and
    the comparison comprises removing and/or deleting all the division indices that correspond to the absent positions in the desired dataset.

7. The method of claim 1 wherein the desired dataset comprises an outer contour.

8. The method of claim 7 wherein:
    the comparison between desired dataset and division comprises regarding the outer contour; and
    the comparison comprises removing and/or deleting all the division indices outside the outer contour.

9. The method of claim 1 wherein the comparison comprises a pattern comparison between desired dataset and division.

10. The method of claim 9 wherein adapted division indices are not created in the test plan.

11. A non-transitory computer-readable medium comprising instructions for execution on a computer, wherein the instructions include:
- obtaining a desired dataset of a measured object;
- providing a starting pattern that is independent of measurement data of the measured object, wherein:
  - the providing comprises producing a division,
  - the producing the division comprises applying at least one division function, and
  - the division has a plurality of division indices;
- producing a target pattern by generating a comparison between the desired dataset and the division, wherein at least one division index is adapted in response to a deviation of the division from the desired dataset;
- creating at least one element with at least one piece of pattern information in a test plan in accordance with the target pattern; and
- according to the test plan, controlling operation of a coordinate measuring machine to measure the measured object.

12. The computer-readable medium of claim 11 wherein the instructions further include measuring the measured object in accordance with the test plan.

13. A coordinate measuring machine for measuring a measured object, the coordinate measuring machine comprising:
- a measurement sensor; and
- a data processing unit, wherein:
  - the data processing unit is configured to produce a test plan for measuring the measured object using the measurement sensor,
  - the data processing unit comprises at least one interface configured to provide a desired dataset of the measured object and at least one starting pattern that is independent of measurement data of the measured object,
  - the providing comprises producing a division,
  - the producing the division comprises applying at least one division function,
  - the division has a plurality of division indices, and
  - the data processing unit is configured to:
    - produce a target pattern,
    - compare the desired dataset and the division,
    - adapt at least one division index in response to a deviation of the division from the desired dataset, and
    - create at least one element with at least one piece of pattern information in the test plan in accordance with the target pattern.

14. The coordinate measuring machine of claim 13 further comprising a controller configured to control at least one component of the coordinate measuring machine to measure the measured object in accordance with the test plan.

15. The coordinate measuring machine of claim 13 wherein:
- the desired dataset is based on a model of the measured object; and
- the model of the measured object includes a CAD model.

16. The coordinate measuring machine of claim 13 wherein:
- the desired dataset has a plurality of elements; and
- the desired dataset has at least one of special geometries and regular geometries.

17. The coordinate measuring machine of claim 13 wherein:
- the desired dataset has a pattern containing absent positions; and
- the comparison comprises removing and/or deleting all the division indices that correspond to the absent positions in the desired dataset.

18. The coordinate measuring machine of claim 13 wherein:
- the desired dataset comprises an outer contour;
- the comparison encompasses the outer contour; and
- the comparison comprises removing and/or deleting all the division indices outside the outer contour.

19. The coordinate measuring machine of claim 13 wherein:
- the comparison comprises a pattern comparison between desired dataset and division; and
- adapted division indices are not created in the test plan.

20. The method of claim 1 wherein the plurality of division indices are a plurality of geometric elements arranged in a two-dimensional grid.

* * * * *